United States Patent [19]

Breckinridge

[11] 4,243,323

[45] Jan. 6, 1981

[54] INTERFEROMETER

[76] Inventor: Robert A. Frosch, Administrator of the National Aeronautics and Space Administration, with respect to an invention of James B. Breckinridge, La Canada, Calif.

[21] Appl. No.: 965,368

[22] Filed: Nov. 30, 1978

[51] Int. Cl.³ .............................................. G01B 9/02
[52] U.S. Cl. ................... 356/345; 356/352; 356/358
[58] Field of Search ............. 356/345, 346, 352, 357, 356/358; 350/173

[56] References Cited

U.S. PATENT DOCUMENTS

| | | | |
|---|---|---|---|
| 3,109,049 | 10/1963 | Williams | 356/345 |
| 3,704,934 | 12/1972 | Holmes et al. | 350/152 |
| 3,809,481 | 5/1974 | Schindler | 356/346 |

*Primary Examiner*—John K. Corbin
*Assistant Examiner*—Matthew W. Koren

*Attorney, Agent, or Firm*—Monte F. Mott; John R. Manning

[57] ABSTRACT

An interferometer of relatively simple design which is tilt compensated, and which facilitates adjustment of the path lengths of split light beams. The interferometer includes a pair of plate-like elements with a dielectric coating and an oil film between them, that forms a beamsplitter interface, and with a pair of reflector surfaces at the ends of the plates. A pair of retroreflectors are positioned so that each split beam component is directed by a retroreflector onto one of the reflector surfaces and is then returned to the beamsplitter interface, so that the reflector surfaces tilt in a direction and amount that compensates for tilting of the beamsplitter interface. The oil film is less than about 20 microinches thick, to pass approximately equal amounts of all wavelengths longer than the film thickness, and yet to provide a sliding surface that enables one plate to shift relative to the other. The plate-like elements are slightly tapered to avoid channeling effects.

12 Claims, 5 Drawing Figures

INTERFEROMETER

ORIGIN OF THE INVENTION

The invention described herein was made in the performance of work under a NASA contract and is subject to the provision of Section 305 of the National Aeronautics and Space Act of 1958, Public Law 85-568 (72 Stat. 435; 42 USC 2457).

BACKGROUND OF THE INVENTION

Two major applications of interferometers are in metrication, to measure differences in path length, and in remote sensing, to determine the spectral content of light. In a typical metrication application, a laser beam is split into two beam components at a beamsplitter surface, the components pass along two different paths to two different optical devices such as retroreflectors that return them back to the beamsplitter surface where they are combined, and the combined beam components are directed onto a light detector that detects interference patterns. The detected interference patterns indicate slight differences in the path lengths of the beam components, to thereby detect slight movements of the retroreflectors relative to one another. In a typical remote sensing application, light of an unknown spectrum, such as from stars, the sun, or laboratory sources, is combined with light of known wavelengths such as from a laser, and the interference pattern established between the known and unknown light is detected to determine the spectral composition of the unknown source.

Simple interferometer systems have been very sensitive to misalignments of the beamsplitter devices. Interferometer systems have been proposed which minimized such sensitivity, but they have required a larger number of relatively complex and heavy components. For example, U.S. Pat. No. 3,109,049 by Williams shows a tilt compensated interferometer, which requires four retroreflectors and a multicube optical device which would have to be fairly heavy to accommodate a wide beam. In a variety of applications such as for in flight applications, it is desirable to utilize a relatively simple and low weight system.

SUMMARY OF THE INVENTION

In accordance with one embodiment of the present invention, an interferometer of relatively simple design is provided which is relatively insensitive to small errors in setup and/or which enables simple correction for such errors. The interferometer includes an optical device forming a beamsplitter interface for dividing a beam into a pair of beam components, and also forming a pair of reflector surfaces. A pair of retroreflectors are positioned so that each directs a beam component onto one of the reflector surfaces for reflection back to the beamsplitter interface, where the two returned components are combined to fall onto a detector that detects interference patterns. Small rotations of the optical device, which would otherwise separate the beam components, are instead offset by the fact that tilting of the beamsplitter interface is compensated for by a corresponding tilting of the reflector surfaces.

The optical device includes two optical elements having adjacent surfaces forming the beamsplitter interface. A thin oil film between the elements, which is thinner than the wave length of any light component to be split, avoids absorption of certain wave lengths in a much different proportion than others. The oil film permits the elements to slide relative to one another to adjust the beam paths. The two optical elements can be formed in largely plate-like shapes, but with their two faces angled slightly from one another, such as by one degree, to avoid channeling effects.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
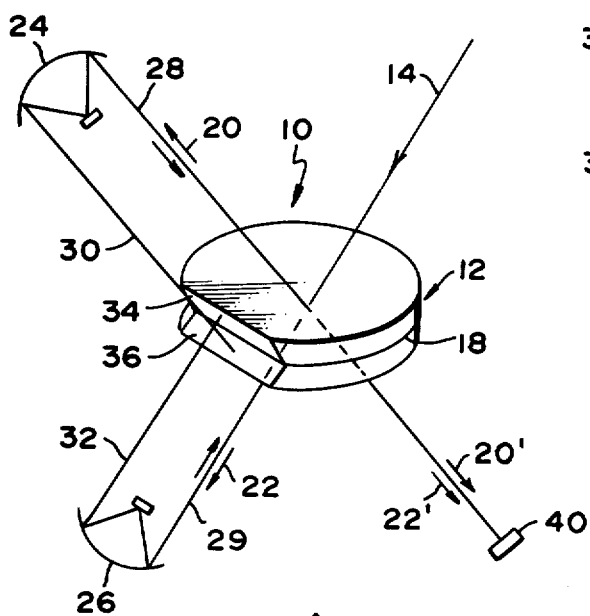
FIG. 1 is a perspective view of an interferometer constructed in accordance with the present invention.
Figure 2:
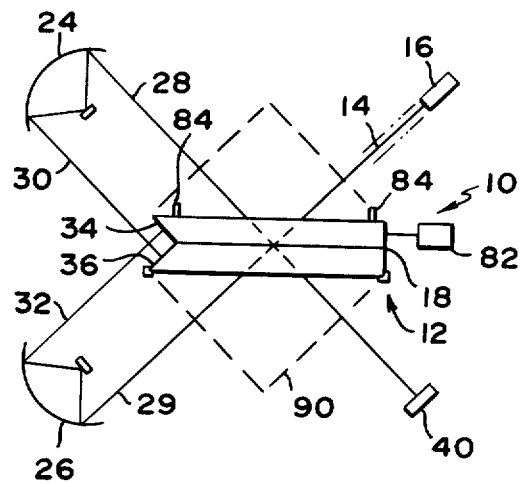
FIG. 2 is a side elevation view of the interferometer of FIG. 1.

As shown in FIGS. 1 and 2, the interferometer 10 includes an optical device 12 that receives an initial light beam 14 from a source 16 which may be a laser in a metrication system, or concentrated starlight or sunlight in a remote sensing system. The optical device includes a beamsplitter interface 18 which divides the initial beam 14 into two components 20, 22 that travel in different paths. A pair of retroreflectors 24, 26 are provided that retro-reflect the beams 20, 22 to direct them from their initial component paths 28, 29 into paths 30, 32 parallel to but offset from the initial component path direction 28, 29. The optical device is provided with a pair of mirror or reflector surfaces 34, 36, and the retroreflectors direct the beam components 20, 22 onto corresponding reflector surfaces 36, 34. The reflector surfaces 34, 36 are offset from the initial component paths 28, 29, but are in line with and perpendicular to the retroreflector-shifted component paths 30, 32. Accordingly, the reflector surfaces 34, 36 direct the beam components back through the retroreflectors to the beampslitter interface 18, where the beam components 20', 22' are combined to fall onto a detector 40. The detector 40 detects the interference pattern between the two beam components. In a metrication application, the interference pattern can represent the difference in path length between the beam component 20 and the beam component 22, to thereby indicate slight shifting of one retroreflector 24 relative to the other 26. In remote sensing, the interference pattern can represent the difference in wave length between various components of the initial beam 14 and of another monochromastic beam from a laser which is directed along the same path.

It is important that the returned beam components 20', 22' be coincident on the detector 40 in order that their interference pattern be accurately sensed. If the optical device 12 should rotate slightly, then the beam components 20, 22 leaving the beamsplitter interface 18 would be directed along slightly different paths than those shown. However, the fact that the reflector surfaces 34, 36 are mounted on the same optical device as the beamsplitter interface 18, results in the reflector surfaces 34, 36 compensating for any small tilting of the beamsplitter interface 18. Since the retroreflectors 24, 26 are insensitive to small tilting and the optical device 12 is also insensitive, the interferometer will operate to accurately recombine the components of the initial beam to direct the components onto the same area of the detector 40, regardless of slight misalignment of the optical elements of the system.

Figure 3:
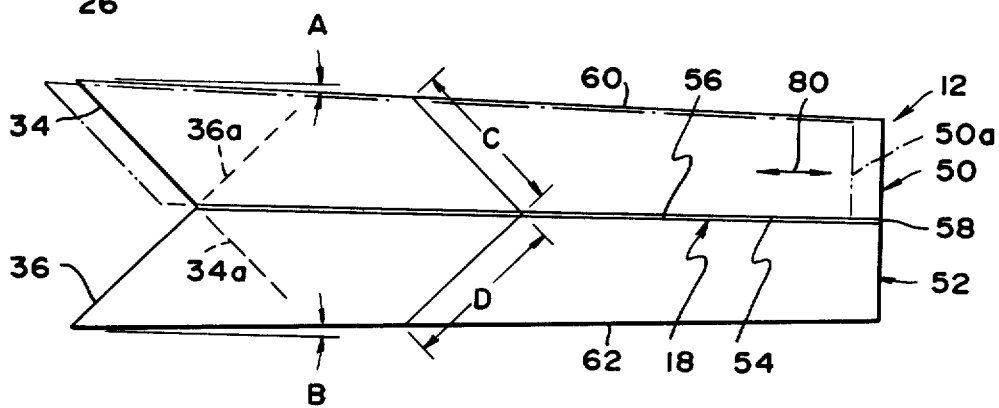
FIG. 3 is a side elevation view of an immersed beamsplitter optical device of the system of FIG. 1.
Figure 4:
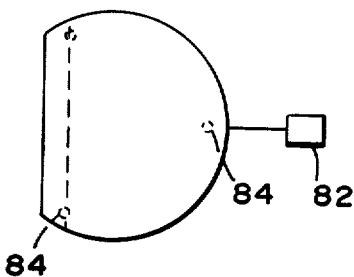
FIG. 4 is a plan view of a portion of the system of FIG. 2.
Figure 5:
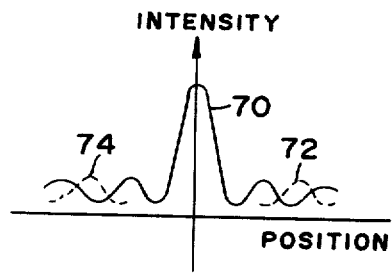
FIG. 5 is a graph showing an interference pattern which can be formed on the interferometer of FIG. 1.

As shown in FIG. 3, the optical device 12 is formed by a pair of plate-like elements 50, 52 having adjacent flat surfaces 54, 56 that are slightly separated, as by an oil or other liquid film 58 to form the beamsplitter interface 18. It may be noted that the elements have solid dielectric coatings facing the oil film, although it is possible to use a dielectric coating on only one of the surfaces that face the oil film. Each of the optical elements also has an opposite face 60, 62 lying opposite the beamsplitter interface. One problem that can occur with an optical device of this construction is that a channeling effect can appear, wherein "ghost" beam components are directed onto the detector 40. Such "ghost" components can occur by reason of the reflection of small amounts of light from the surfaces 60 and 62 which pass most of the light incident thereon but which reflect a small amount of such light. The small amounts of light reflected at the surfaces 60, 62 can find their way into the retroreflectors, reflector surfaces, and the detector 40, particularly where a convenient wide initial beam 14 is utilized. The channeling effect can result in an interference pattern of the type shown in FIG. 5, wherein the major determinant of light intensity at the detector is indicated by graph 70 which represents the interference pattern between the beam components derived from the beamsplitter interface 18. However, two additional "ghost" components at 72 and 74 are present due to the partial reflections at the surfaces 60, 62 of the optical elements, which can add to the perceived interference pattern.

In order to avoid channeling effects, the opposite surfaces 60, 62 of the optical device are angled by angles A and B from parallelism with the surfaces 54, 56 at the beamsplitter interface. This angling, which may be by a small amount such as 1° from parallelism, results in the reflections from the surfaces being directed at a different angle than the beam components split at the beamsplitter interface 18, so that these ghost images are not combined onto the detector 40.

In remote sensing applications, it can be important that the path length of the beam components 20, 22 within the glass or other crystalline material of the optical device 12, be precisely identical. That is, after the initial beam 14 is split at the beamsplitter interface 18, the beam component 20 passes a distance C through the crystalline material of the element 50 in passing out of it, and then passes along another distance C during its return to the interface 18. The other beam component 22 passes a distance $2 \times D$ through the optical element 52 in passing out of it and during its return. If the distance $2 \times C$ is slightly different than the distance $2 \times D$, then one beam component will be retarded in phase by slightly more than the other beam component. Where the initial beam contains many different wave lengths, such a difference cannot be compensated for by shifting the position of one of the retroreflectors, since such shifting could compensate for only one wave length, but not for other wave lengths which are retarded by different amounts by any given crystalline material. Thus, it can be important that the two optical elements 50, 52 be positioned to make the distances C and D very closely equal, such as within one tenth wavelength of light.

It can be difficult to construct the two optical elements 50, 52 and then mount them on one another so that the distance C equals the distance D to within perhaps one tenth wave length of light, which may be about 2 microinches. Instead, the two elements 50, 52 are mounted on one another so that they can be shifted slightly as indicated by the arrow 80. During setup of the interferometer, if it is found that the distance C is slightly larger than the distance D, then the element 50 can be shifted to the position 50a to reduce the distance C, such shifting being easily accomplished by a precision actuator 82. Although the change in distance C may be very small such as two millionths inch, this can be easily accomplished by a moderately accurate positioning device, because the change in the distance C is about 1.5 times the shift in the direction 80 times sin A. Since the term sin A is very small where A is on the order of a degree, the change in C is a small fraction of the lateral shift in the direction of arrow 80. The oil film 58 facilitates such shifting of one element with respect to the other. It may be noted that in remote sensing applications, it can be useful to produce a precision offset of one path length $2 \times C$ with respect to the other $2 \times D$, and the oil film and wedge shaped optical element construction permits this.

The oil film 58 also permits shifting of the reflector sufaces 34, 36 to change the relative path length of the beam components in air. This is useful in metrication applications. It may be noted that a shift of element 50 in the direction of arrow 80 results in changing the path length in air of the beam component 22, by about three quarters as much.

The liquid film 58 which serves as a bearing to permit shifting, or shearing movement, of one optical element 50 with respect to the other 52, and which also separates the adjacent surfaces of the elements at the beamsplitter interface, is preferably very thin. So long as the thickness of the liquid film 58 is less than the thickness of any wave passing therethrough, there is a relatively small amount of light absorption, and the absorption is approximately equal for all wave lengths. With the oil film thinner than the wavelength of light passing therethrough, the oil film does not produce the beamsplitting effect, but instead the dielectric coatings on the element surfaces 54 and/or 56 do so. If the thickness of the oil film 58 becomes greater than the wave length passing therethrough, then a much higher proportion of certain wavelengths may be absorbed than of other wavelengths. Since visible light has a wavelength of about 20 microinches (green light which is at the peak of visibility has a wavelength of 21.6 microinches), the oil film 58 is preferably less than 20 microinches thick, and is preferably thinner than the shortest wave length to be passed through the beamsplitter interface. It should be noted that care in selecting the liquid should be exercised where ultraviolet light is to be dealt with, since many oil films fluoresce when exposed to ultraviolet radiation. It is found that a thin oil film can be maintained for a long period of time such as a year or more without any retaining device, with the only maintenance being occasional wiping up, perhaps every week, of a slight amount of oil that may seep aroung the edges of the interface. However, the elements must be constantly pressed together. The weight of an upper element 50 can be utilized where there are no disturbances, or other devices such as three springs 84 can be utilized to press one element 50 against the other 52, with the element 52 being conveniently held in a thin frame that extends around the corner or outer edge of the element 52. It would be possible to permit the optical elements to contact one another instead of utilizing the oil film, but then it would be difficult to obtain precision sliding movement. An air or vacuum gap about as thin as the oil film could be utilized, but such a gap is very difficult to maintain.

Instead of utilizing slightly wedge-shaped optical elements 50, 52 it would be possible to utilize a cubelike shape as indicated at 90 in FIG. 2. Such a cubelike device avoids the channeling effect, but results in an optical device that weighs several times more than the relatively thin optical device 12 for a given "window". By utilizing wedge angles A and B of much less than 30°, such as about 1°, thin elements can be utilized without giving rise to channeling effects. It also may be noted that a variety of retroreflector devices can be utilized, although the cats-eye type indicated at 24 and 26 is found very useful.

The reflector surfaces 34, 36 are located on the outside surface of the optical device and are coated with aluminum or other reflective material, to provide very little light absorption. The reflector surfaces are angled by 45° to the beamsplitter interface and 90° to each other. It may be noted that the reflector surfaces could be formed along the lines 34a, 36a to extend at acute angles, instead of obtuse angles with the corresponding splitter surfaces, but this would greatly reduce the "window", or beam width than can be reflected, without greatly reducing the weight of the optical device.

Thus, the invention provides an interferometer of relatively simple and light-weight design, which can function despite moderate misalignment of its various parts. Compensation for slight tilting is provided for by utilizing reflector surfaces on the same optical device which forms a beamsplitter, and by utilizing retroreflectors that direct the split beam components onto the reflector surfaces so that simultaneous tilting by the same amount and in the same direction, of the beamsplitter interface and the reflector surfaces, will cause the rotation to be compensated for. It may be noted that in a conventional Michelson interferometer, the beamsplitter must be maintained within perhaps several seconds of arc of a predetermined position, while an interferometer of the type illustrated herein can function with a misalignment of the optical device of about 0.5 degree to 5 degrees, depending on the particular construction. The optical device can be easily manufactured in a compact and low weight construction, by using a pair of largely plate-like elements with a beamsplitter interface between them, and a thin oil film can be placed between the surfaces to permit slight shifting of the elements. Channeling effects can be avoided by making the plate-like elements slightly wedged-shaped. The oil film permits shifting of one optical element with respect to the other to enable compensation for slight differences in the angles of the wedge-shaped elements and in their alignment. The shifting also permits slight changes in the path lengths of the beam components outside the optical device by shifting one reflector surface relative to the other. The oil film is preferably thinner than the wave lengths passing therethrough, such as less than 20 microinches, to minimize absorption and to minimize differences in the degree of absorption for different wave lengths.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. An interferometer comprising:
   a pair of substantially plate-like optical elements having facewise adjacent splitter surfaces forming a beamsplitter interface, each of said elements having an edge portion forming a reflector surface angled from said splitter surfaces;
   a pair of retroreflector means positioned to direct the components of a light beam split at said beamsplitter interface, onto corresponding reflector surfaces, and to direct the components reflected from said reflector surfaces back to said beamsplitter interface; and
   a light detector positioned to receive beam components which have been directed back to said beamsplitter interface.

2. The interferometer described in claim 1 wherein:
   each of said optical elements is wedge shaped, with each element having two flat faces extending in planes slightly angled from parallelism, one of said faces forming one of said facewise adjacent surfaces.

3. The interferometer described in claim 1 wherein:
   each of said reflector surfaces extends at an obtuse angle with respect to the splitter surface of the same element.

4. An interferometer comprising:
   an optical device which includes first and second optical elements having flat facewise adjacent surfaces forming a beamsplitter interface for dividing an initial beam directed along an initial path into a pair of beam components initially passing along a pair of initial component paths, each of said optical elements also forming a reflector surface offset from one of said initial component paths, and said elements being slidable with respect to one another along said facewise adjacent surfaces;
   first and second retroreflectors, each positioned to direct light moving along one of the initial component paths to one of said reflector surfaces for reflection therefrom back through the retroreflector and to the beamsplitter interface to combine said components; and
   detector means responsive to said combined beam components.

5. An interferometer comprising:
   an optical device which includes two largely plate-like elements having flat adjacent surfaces forming a beamsplitter interface for dividing an initial beam directed along an initial path into a pair of beam components initially passing through different elements along a pair of initial component paths, said optical device also forming a pair of reflector surfaces offset from said initial component paths;
   first and second retroreflectors, each positioned to direct light moving along one of the initial component paths to one of said reflector surfaces for reflection therefrom back through the retroreflector and to the beamsplitter interface to combine said components; and detector means responsive to said combined beam components;

each of said plate-like elements having a face opposite said beamsplitter interface, which is angled from parallelism with the interface surface of the element by less than 30°.

6. The interferometer described in claim 5 wherein: said elements are slidable relative to one another along said beamsplitter interface, whereby to enable adjustment of the beam component path lengths within the elements.

7. An interferometer comprising:

an optical device forming a beamsplitter interface for dividing an initial beam directed along an initial path into a pair of beam components initially passing along a pair of initial component paths, said optical device also forming a pair of reflector surfaces offset from said initial component paths;

first and second retroreflectors, each positioned to direct light moving along one of the initial component paths to one of said reflector surfaces for reflection therefrom back through the retroreflector and to the beamsplitter interface to combine said components; and detector means responsive to said combined beam components;

said optical device including a pair of optical elements having adjacent surfaces lying at said beamsplitter interface, and a thin fluid film between said adjacent surfaces, said film having a thickness less than about twenty microinches, whereby to pass high proportions of visible light wave lengths which are shorter than the film thickness.

8. In an interferometer which includes a detector for detecting the interference pattern formed by combined light beam components, the improvement of a beam splitter device comprising:

first and second optical elements having facewise adjacent surfaces; and a film of liquid lying substantially between and in contact with said surfaces, and defining the separation between said element surfaces;

said liquid film having a thickness less than 20 microinches, whereby to pass a largely uniformly high proportion of light of a range of wavelengths that are directed at said film.

9. The improvement described in claim 8 wherein:

at least one of said optical elements has a dielectric coating at its surface which lies facewise adjacent to the other element surface.

10. In an interferometer which includes a detector for detecting the interference pattern formed by combined light beam components, the improvement of a beam splitter device comprising:

first and second optical elements having facewise adjacent surfaces;

a film of liquid lying substantially between and in contact with said surfaces, and defining the separation between said element surfaces; and an actuator coupled to at least one of said elements to shift it relative to the other element along said liquid film.

11. In an interferometer which includes a detector for detecting the interference pattern formed by combined light beam components, the improvement of a beam splitter device comprising:

first and second optical elements having facewise adjacent surfaces; and a film of liquid lying substantially between and in contact with said surfaces, and defining the separation between said element surfaces;

each of said elements being largely in the form of a plate with a pair of substantially flat spaced surfaces, but the pair of surfaces of at least one element lying in planes angled on the order of magnitude of 1° from parallelism with each other.

12. In an interferometer which includes a detector for detecting the interference pattern formed by combined light beam components, the improvement of a beam splitter device comprising:

first and second optical elements having facewise adjacent surfaces, each element also having a reflector surface angled 45° from said adjacent surfaces;

a film of liquid lying substantially between and in contact with said surfaces, and defining the separation between said element surfaces; and a pair of retroreflectors, each positioned to direct a light beam component emerging from one of said optical elements adjacent surfaces at a 45° angle therefrom, onto one of said reflector surfaces for reflection back to said element surface.

* * * * *